Dec. 28, 1943.   E. E. CHRISTOPHER   2,337,543
INTERNAL COMBUSTION ENGINE
Filed April 25, 1941   3 Sheets-Sheet 1
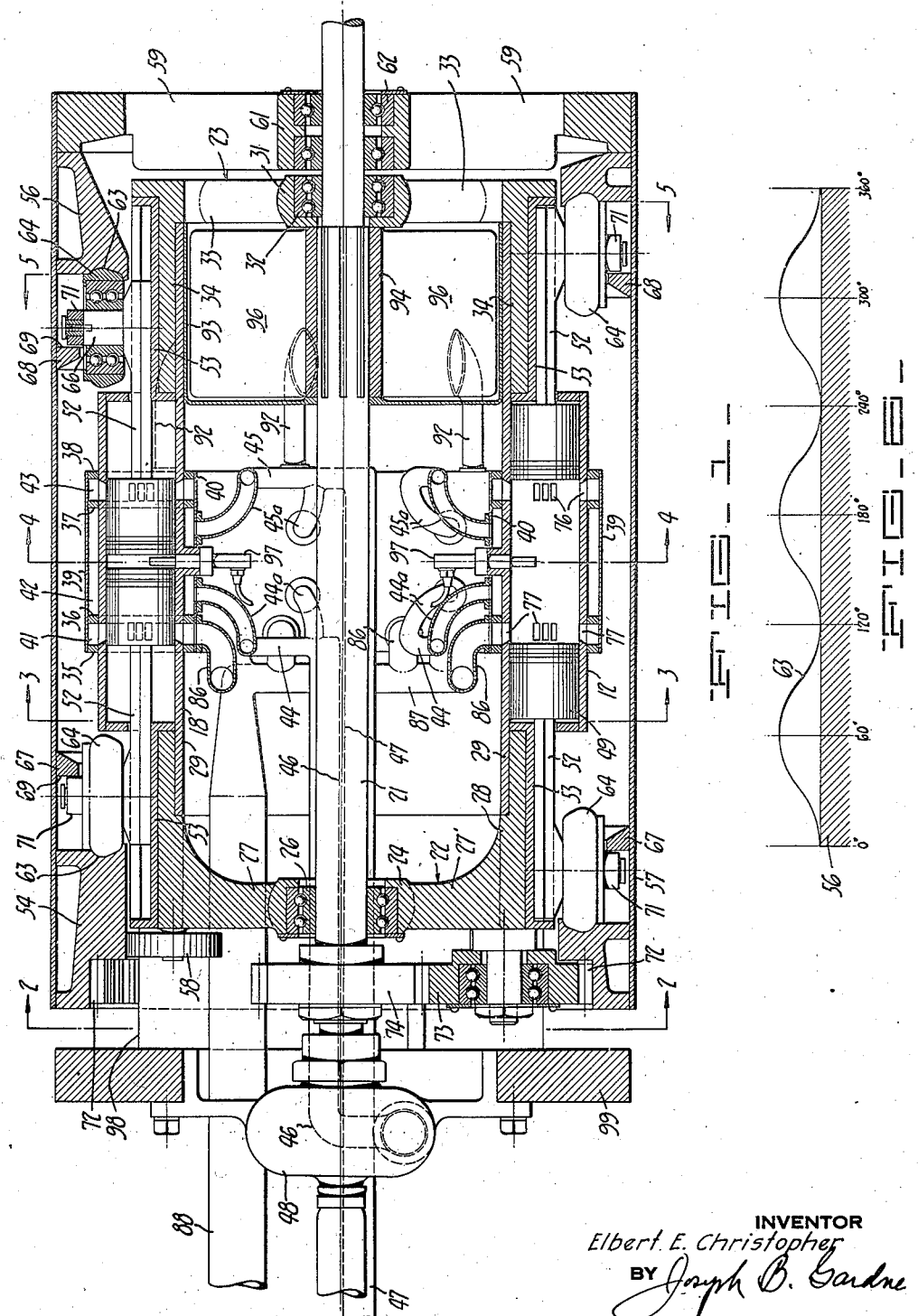
INVENTOR
Elbert E. Christopher
BY Joseph B. Gardner
ATTORNEY Dec. 28, 1943.　　　E. E. CHRISTOPHER　　　2,337,543
INTERNAL COMBUSTION ENGINE
Filed April 25, 1941　　　3 Sheets-Sheet 2
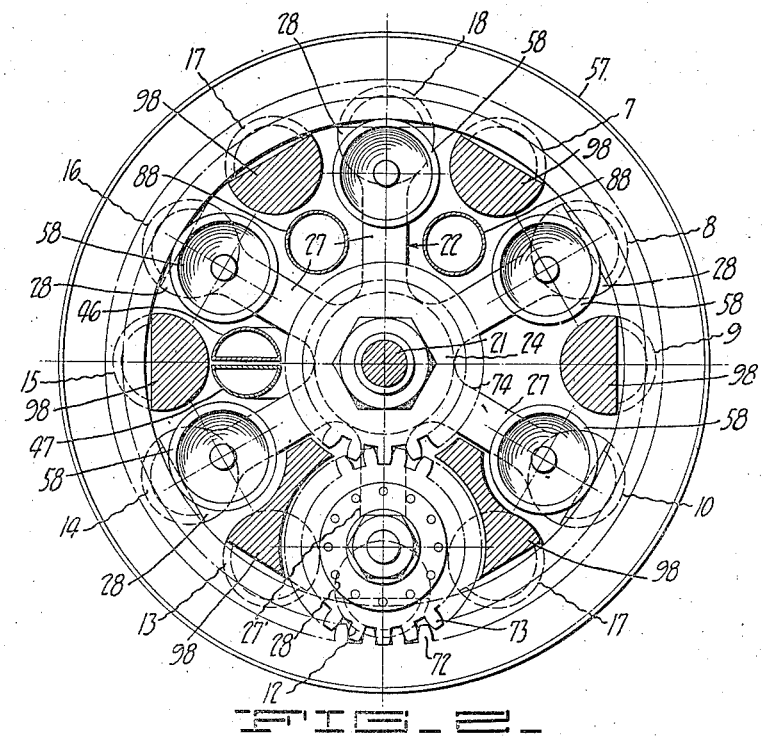
FIG_2_
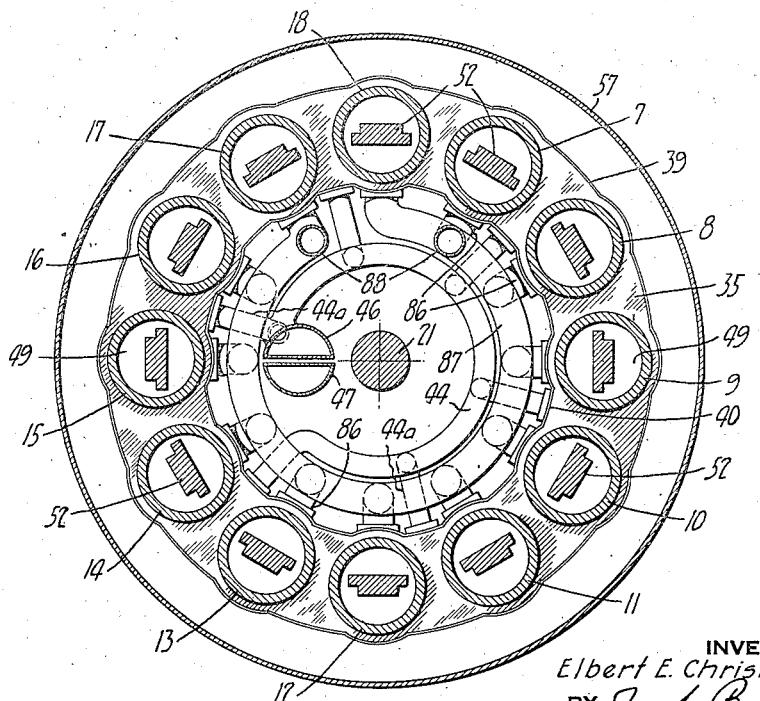
FIG_3_
INVENTOR
Elbert E. Christopher
BY Joseph B. Gardner
his ATTORNEY Dec. 28, 1943.   E. E. CHRISTOPHER   2,337,543
INTERNAL COMBUSTION ENGINE
Filed April 25, 1941   3 Sheets-Sheet 3

INVENTOR
Elbert E. Christopher
BY Joseph B. Gardner
ATTORNEY

Patented Dec. 28, 1943

2,337,543

UNITED STATES PATENT OFFICE 2,337,543

INTERNAL COMBUSTION ENGINE

Elbert E. Christopher, Oakland, Calif.

Application April 25, 1941, Serial No. 390,320

5 Claims. (Cl. 123—58)

The invention relates to internal combustion engines.

An object of the invention is to provide an internal combustion engine of a new design and construction providing an improved high horse power output to weight and size ratio and an improved design, construction and arrangement of the engine cylinders, pistons, connected moving parts, and intake and discharge manifolds and other engine parts and mechanism.

A main feature of the engine is the provision of a plurality or bank of engine cylinders arranged in cylindrical form about a central engine shaft, and a cylindrical casing surrounding the cylindrical bank of cylinders and operatively connected by a circular cam means to opposed reciprocating pistons in the cylinders to provide rotation of said casing upon reciprocation of the pistons and operatively connected to the center shaft to provide rotation thereof at a different speed from said casing, in combination with a blower mechanism mounted concentrically on said shaft and an improved scavenging and supercharging arrangement for the cylinders, and wherein the cylinders are water-cooled and the water conduits as well as the intake and discharge manifolds and conduits and fuel conduits, and all of the other operating parts, are arranged entirely within the confines of the outer cylindrical casing aforementioned.

Another object of the invention is to provide an internal combustion engine of the character described wherein the connecting rods and connection means therefor to the cams of the engine are so designed and constructed as to ably support the longitudinal, lateral and bending thrust on the rods.

A further object of the invention is to provide an improved blower construction for the engine having a two-stage operation for scavenging and supercharging the engine cylinders.

Still another object of the invention is to provide an engine of the character above which may be supported exclusively from one end thereof in a horizontal position of the central axis of the engine whereby the engine is well adapted for aeroplane use where the same may be mounted and supported from the leading fuselage and wing surfaces.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a longitudinal cross-sectional view of an engine constructed in accordance with the present invention.

Figure 2 is a cross-sectional view of the engine taken substantially on the plane of line 2—2 of Figure 1.

Figure 3 is a cross-sectional view of the engine taken substantially on the plane of line 3—3 of Figure 1.

Figure 6 is a developed view showing the undulated part of one of the circular cams.

Figure 4:
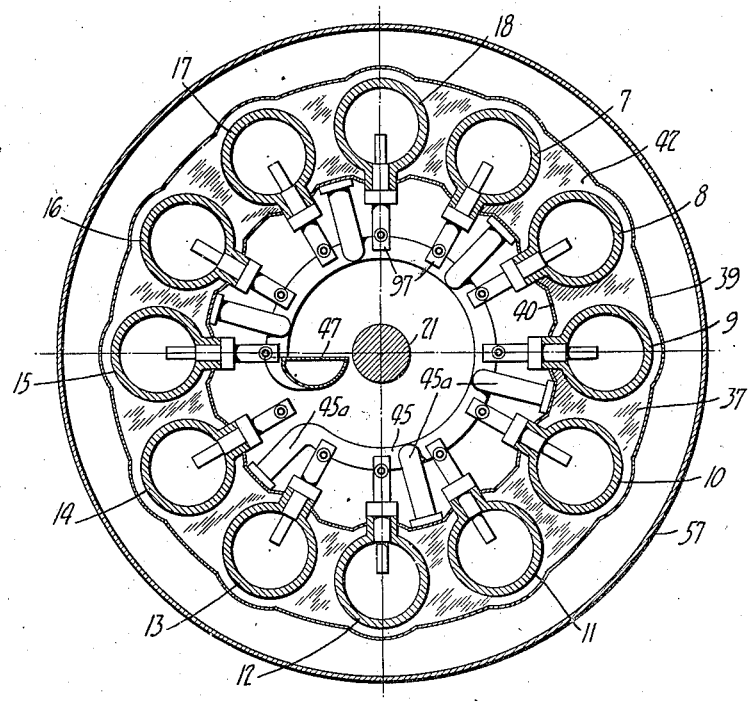
Figure 4 is a cross-sectional view taken substantially on the plane of line 4—4 of Figure 1.

The internal combustion engine of the present invention and as illustrated in the accompanying drawings, see Figure 4, consists of a plurality or bank of engine cylinders 7, 8, 9, 10, 11, 12, 13, 14, 15, 16, 17 and 18 which in the present construction are each tubular in cross-section and arranged in substantially coterminous parallel position arourd a central longitudinal engine shaft 21 and spaced from such shaft by substantially equal radii and spaced around the shfat in substantially equal circumferentially spaced relation. While I have here shown 12 of such cylinders it will be clear that any suitable number of cylinders may be used. The principal mounting support for the cylinders and the shaft consists of a pair of wheel or spider members 22 and 23 adjacent the rear and forward ends respectively of the cylinders. The rear supporting member 22 is formed with a central hub portion 24 which serves as a support for a bearing 26 in which the shaft 21 is journaled and secured to and radiating from the hub portion 24 are a plurality of arms 27 which extend longitudinally from outer ends 28, see Figure 1, and engage in reduced semi-circular portions 29 of the cylinders. In the present construction the arms 27 connect to and support every other one of the cylinder ends and here furnish end support for cylinders 8, 10, 12, 14, 16 and 18.

Figure 5:
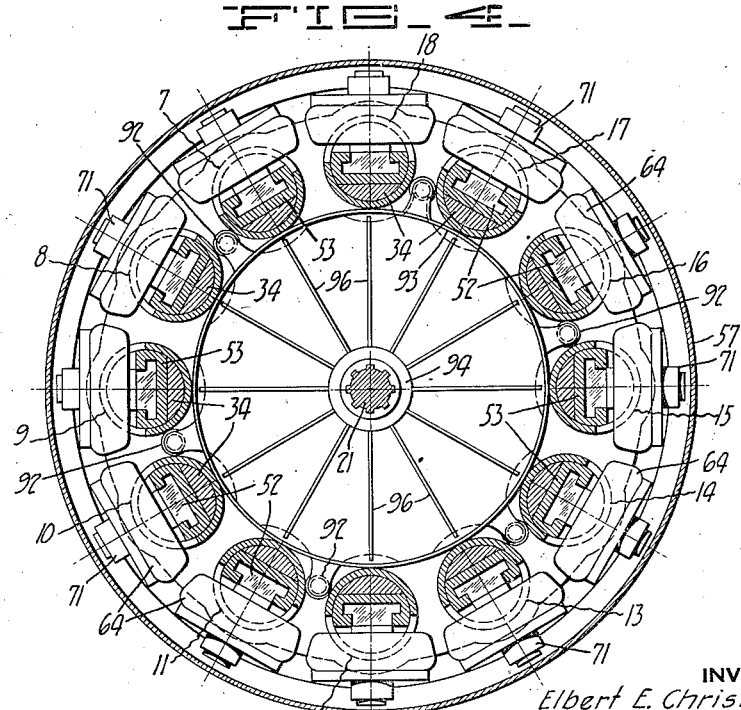
Figure 5 is a cross-sectional view of the engine taken substantially on the plane of line 5—5 of Figure 1.

The supporting member 23 at the opposite end of the engine is similarly constructed with a central hub portion 31 which supports a bearing 32 in which the opposite end of shaft 21 is journaled and from which hub portion extend a plurality of radial arms 33, preferably equal in number to the number of said cylinders and each formed with longitudinal extensions 34 at their outer ends for engaging in and supporting the adjacent ends of the cylinders which are as in the case of the opposite ends, reduced to a semi-cylindrical form, as for example shown in Figure 5.

In addition to the foregoing described support, the cylinders are mutually supported and attached to each other by a series of similar shaped annular ring members 35, 36, 37 and 38, see Figures 1 and 4, which are mounted concentric to the shaft in longitudinally spaced planes adjacent the center portion of the cylinders and formed with a plurality of longitudinally aligned circumferentially spaced openings receiving said cylinders, the ring members being thus secured to the cylinders at spaced longitudinal portions adjacent the center portion of the cylinders and providing a very strong and rigid support for the cylinders in a cylindrical bank form secured to and bridging the outer and inner peripheries of the ring members are cylindrical wall members 39 and 40 which define with the ring members and around the cylinders a plurality of longitudinally spaced chambers 41, 42 and 43 serving in the present instance as discharge, water cooling, and intake chambers respectively for the engine.

The water inlet and discharge connections to the water jacket are made from annular manifold pipes 44 and 45, see Figures 1, 3 and 4, mounted concentrically to the shaft at the inside of the bank of cylinders and connected to the water jacket by way of a plurality of relatively short radial pipes 44a and 45a, the manifold pipes being connected by semi-circular conduits 46 and 47 extending longitudinally from the manifold pipes 41 and 42 to the rear end of the engine, where the same are connected to a water pump 48, mounted concentrically upon and driven by the central shaft 21, and to a radiator (not shown).

Mounted for reciprocation in each of the cylinders 7-18 is a pair of opposed pistons 49 and 51 which are arranged to reciprocate in each of the cylinders in an out of phase relation so as to cause a compression of the working chamber upon movement towards each other and an expansion of the working chamber upon movement away from each other. Connected to the pistons and extending longitudinally therefrom in the direction of the opposite ends of the engine are a plurality of connecting rods 52 which are carried for reciprocation in elongated slide blocks 53, see Figure 5, which are mounted within the semi-circular end portions of the cylinders upon the longitudinally extending arm portions 28 and 34 of the supporting arms of the engine. In accordance with the present construction, the connecting rods 52 are operatively engaged with circular cam members 54 and 56 mounted in longitudinally spaced relation to the rear and forward ends of the cylinders at and secured to the inner periphery of a cylindrical casing 57 completely surrounding the cylindrical bank of cylinders and rotatably carried upon the end support 22 and the shaft 21, as illustrated in Figure 1. As will be seen from Figures 1 and 2, a plurality of rollers 58 are mounted on certain of the radial arms 27 of the rear engine support 22 and rotatably engage the inner periphery of the cam member 54, which is as aforementioned secured to the inner periphery of the casing 57 so as to securely support the casing in concentric relation to the cylindrical bank of engine cylinders and the shaft 21. At the opposite front end of the engine, a plurality of radial members 59, here formed as fan blades, extend inwardly radially from the forward end of the circular cam member 56 and are joined at their inner extremity to a central hub 61 journaled on the shaft 21 by means of a bearing 62.

Each of the cam members 54 and 56 is formed with an undulated cam surface 63, shown in developed form in Figure 6, which faces the adjacent ends of the cylinders and is operatively engaged by rollers or followers 64 carried by the connecting rods 52. As will be seen in Figure 1, the rollers 64 are journaled on pins or studs 66 extending outwardly from the connecting rods adjacent the outer ends thereof, and engage the undulated face 63 of the adjacent cam member along a circle of slightly greater diameter than the diameter of the bank of cylinders. Preferably and as here shown, the roller 64 and the engaged cam face 63 are formed with longitudinal interfitting portions to securely hold the roller and cam face in proper engagement, and preferably the interfitting portions are constructed to give the roller a slightly larger diameter towards the outer side thereof, that is away from the center axis of the engine, to compensate for the greater rotating speed of the radially outer portions of the roller face. In order to cause the rollers 64 to constantly engage the cam faces 63 and to thereby provide a continuous related movement between the outer casing and the pistons, a second set of circular cam members 67 and 68 are mounted at the inner periphery of the casing 57 adjacent to but longitudinally spaced from the cam members 63 and which are formed with undulated cam surfaces 69 which are opposed to and are the complement of the undulations of the cam surfaces 63 and which engage rollers 71 carried on the studs 66 to provide the separating movement of the pistons. Thus the main cam members 54 and 56 normally support the compression and power strokes of the pistons, but the auxiliary cam members 67 and 68 insure the separating movement of the pistons and are particularly of importance where the engine is adapted for four-cycle operation. In the present construction where the engine is designed for two-cycle operation, the auxiliary cam members function primarily to insure a smooth continuous connection between the members 54 and 56 and the rollers on the connecting rods. Preferably and as best illustrated in Figures 3 and 5, the connecting rods 52 are of T shaped cross-section in order to best withstand the longitudinal transverse and bending stress thereon, and preferably the slide blocks 53 are provided with conforming T shaped grooves for receiving the exterior surface of the connecting rods.

In accordance with the present construction and as an important feature thereof, the shaft 21 is directly driven by the casing 57 by means permitting of a selection of relative speeds of rotation of the shaft and casing. In the present construction, the shaft 21 is driven at a greater speed than that of the casing. As will be best seen in Figures 1 and 2, the cam member 54 is formed with an internal ring gear 72 which meshes with a spur gear 73 journaled on one of the supporting arms 27' of the rear support 22. The gear 73 is in turn enmeshed with a gear 74 on the shaft 21. While, as will be clear, an increase in speed of the shaft is here effected by reason of the larger diameter of the ring gear compared to the gears 73 and 74, it will be understood that substantially any desired speed relationship between the casing 57 and the shaft may be obtained by a proper selection of gear diameters.

Intake of air and discharge of products of combustion into and from the cylinders is arranged to be effected by way of sets of circumferentially spaced slots or ports 76 and 77 arranged around the cylinders in longitudinally spaced relation adjacent the opposite ends of the working length of the cylinder and in a longitudinal position normally covered by the pistons 49 and 51, but uncovered by such pistons at the ends of their separating movement. These sets of ports open to the surrounding end chambers 41 and 43 aforementioned. The end chamber 41, here serving as the discharge chamber for the cylinders, is connected by a plurality of short radial conduits 86, see Figures 1, 2 and 3, to a substantially annular manifold 87 to which is connected an exhaust pipe 88. The end chamber 43, here serving as the intake chamber, is connected by a plurality of conduits 92 to a blower housing 93 mounted concentrically about the shaft 21 adjacent to the end supporting member 23 of the engine. Secured to a hub 94 fixed to the shaft 21 within the blower housing 93 are a plurality of radial blades 96, see Figures 1 and 5, which rotate with the shaft and receive air through the open front end of the casing 93 from the forward fan blades 59 aforedescribed. In this manner the forward fan blades 59 serve as the first stage of a two-stage blower, and drive the air into the blades 96 where a further increase in pressure of the air is effected for moving the air into the engine cylinders. As will be understood with reference to Figure 1, when the pistons 49 and 51 are at the ends of their separating movement, both the inlet and discharge ports are opened thereby creating a straight-through passageway completely through the full longitudinal length of the working portion of the cylinder. Thus a full and complete blowing out of the exhaust gases is effected and an improved scavenging of the cylinders results. As the pistons start their return movement, the intake and discharge ports are again covered and substantially pure air is confined between the pistons for compression.

The present engine has been designed and constructed to operate on a Diesel cycle using solid fuel injection and in keeping with this design, I mount a plurality of fuel injection nozzles 97, one for each of the cylinders, around the inside of the bank of cylinders with each of the nozzles projecting radially into one of the cylinders adjacent the center thereof, see Figures 1 and 4. Also as will be clear from the foregoing the engine is here designed for two-cycle operation wherein each separating movement of the pistons constitutes a power stroke of the engine. The cam members 54 and 56 are so constructed at their undulated cam faces 63 to provide three power impulses per revolution of the casing 57. This arrangement of the undulated cam surface 63 is illustrated in Figure 6. While the present engine is specifically designed for two-cycle Diesel operation, it will be understood that an air and gaseous fuel mixture such as obtained from a carburetor may be admitted to the cylinders for operation on an Otto-cycle, and valves and other appropriate mechanism well understood in the art could be supplied for four-cycle operation.

One of the important features of the present design, and as above mentioned, is the arrangement for supporting the engine exclusively from one end thereof. This is effected in the present construction by securing a plurality of longitudinally extending supporting members 98 to the rear ends of cylinders 7, 9, 11, 13, 15, and 17, as illustrated in Figures 1 and 2, and securing the rear ends of these longitudinal members to a mounting ring 99. The use of the mounting ring is optional and the longitudinal members 98 may be otherwise secured to a supporting structure. In this manner the engine may be exclusively supported from its rear end in a horizontal position of the longitudinal central axis of the engine, whereby the engine may be supported on the fuselage or wing structure of an aeroplane with the engine adjacent to and projecting from the leading surfaces of the fuselage and wing. When so used for aeroplane work, the forward end of shaft 21 is arranged to receive and drive the propeller for the aeroplane.

It will now be clear that the design, arrangement and construction of the several engine parts above described is such as to provide maximum and ample bearing sizes and strength of parts, together with maximum compactness and an improved high horse power output to weight and size ratio. In addition to the contributing features mentioned in the foregoing, it may be noted that in the present construction the circular cams 54 and 56 are here constructed of sufficient size and proper design so as to be substantially self-supporting and the mounting of these cam members close to the inner periphery of the drum or casing 57 relieves the casing of substantially all but a straight longitudinal stress and accordingly the casing may be constructed of relatively light weight material. It may be further noted that in the present construction, the water intake and outlet conduits as well as the several manifold conduits are all arranged within the confines of the rigid cylinder block whereby these members are reduced to a minimum length and an improved compactness of the engine is obtained.

I claim:

1. An internal combustion engine comprising, a plurality of cylinders mounted in parallel relation of their axes around a circle in circumferentially spaced relation, pistons reciprocally mounted in said cylinders, a stationary support for said cylinders and holding said cylinders stationary, a cylindrical casing surrounding said cylinders concentric thereto and rotatably carried by said support, a circular cam member carried by said casing at the inner side thereof in endwise relation to said cylinders, means connecting said pistons to said member to provide a related reciprocation of said pistons and rotation of said casing, and a power shaft extending parallel to and between said cylinders and rotatable relative thereto.

2. An internal combustion engine comprising, a plurality of cylinders mounted in substantially coterminous parallel relation and in circumferentially spaced relation at equal radii about a common central axis, opposed pistons reciprocally mounted in each of said cylinders, a stationary support for said cylinders holding the latter against movement around said axis, a cylindrical casing surrounding said cylinders in concentric relation thereto and mounted for rotation on said support about said axis, circular cam members secured to the inner periphery of said casing adjacent the opposite ends of said cylinders and in endwise relation thereto and each having an undulated annular portion facing the ends of said cylinders, and connecting rods secured to said pistons and operatively engaged with said cam portions to provide rotation of said casing upon out of phase reciprocation of each pair of said pistons, a shaft rotatably carried by said support longitudinally and centrally of the engine rotatable relative to said cylinders, and gear means connecting said shaft to said casing.

3. An internal combustion engine comprising, a plurality of stationary cylinders mounted in parallel relation of their axes around a circle in circumferentially spaced relation, pistons reciprocally mounted in said cylinders, a stationary support for said cylinders, a cylindrical casing surrounding said cylinders concentric thereto and rotatably carried by said support, a circular cam member carried by said casing at the inner side thereof in endwise relation to said cylinders, a central power shaft rotatably carried by said support, a ring gear carried by said casing adjacent one end, and gear means connecting said shaft to said ring gear to provide rotation of said shaft with said casing, said support having an inner portion interposed between said shaft and casing and an outer portion extending axially outwardly from and positioned exteriorly of said casing adjacent said end.

4. In an internal combustion barrel type engine of the character described, a central rotary engine shaft, a plurality of stationary cylinders arranged about said shaft with their axes parallel thereto, a stationary supporting member about said shaft for holding said cylinders against movement about the shaft, a power take-off casing surrounding said cylinders and geared to said shaft and mounted upon said support for rotation thereon, and a rotary cam driving connection between said cylinders and casing interposed between said support and casing.

5. An internal combustion engine comprising a plurality of stationary cylinders, means for supporting said cylinders in substantially coterminous parallel relation and in equal circumferentially spaced relation at equal radii about a common central axis, a rotary shaft supported for rotation by said means along said axis, a casing supported for rotation by said means around said cylinders and concentric to said axis, said casing carrying a circular cam member, and pistons operatively connected to said cam member, gear means for connecting said rotary shaft to said casing, and a plurality of radial arms connected to and extending inwardly from said casing adjacent one end thereof and journaled for rotation on said shaft, said arms providing air impeller blades.

ELBERT E. CHRISTOPHER